Patented Dec. 5, 1944

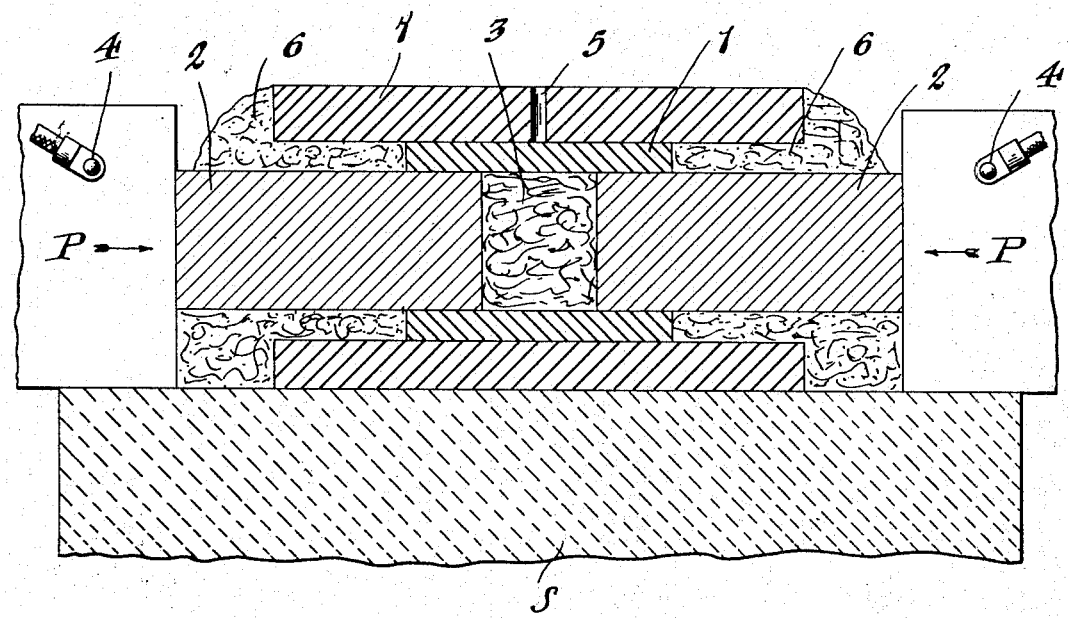

2,364,123

UNITED STATES PATENT OFFICE 2,364,123

METHOD OF FORMING METAL CARBIDES

Raymond C. Benner and William G. Soley, Niagara Falls, N. Y., assignors to The Carborundum Company, Niagara Falls, N. Y., a corporation of Delaware Application November 14, 1941, Serial No. 419,048

2 Claims. (Cl. 23—208)

This invention relates to the making of hard carbides. One of the objects of the invention is to produce such hard carbides free or substantially free from carbon inclusions. Another object is to devise a simple, inexpensive, and easily controlled method of making the aforesaid hard carbides.

It has long been known that many carbides, besides silicon carbides, were very hard and refractory. However, these materials have not been used with much success in abrasive or refractory work, because of the high cost of manufacture and the difficulty of obtaining a pure product. In the majority of cases it is not possible, because of expense, to use the metal itself as the carbide forming material, and hence the oxide of such metal is employed. The oxides of many of the metals which form carbides hard enough to be of value in the fields above set out have a very high fusing or decomposition point. A carbon or graphite container is the only type of container which will withstand the high temperatures necessary in prior art methods of forming such carbides involving the melting or decomposition of the oxide. However, since carbon has a marked tendency to enter into solid solution in nearly all carbides, it is virtually impossible in many cases to form the pure carbide. Instead, a product is obtained by such prior methods in which the correct stoichiometric proportion of carbon to metal is not found, and which contains more or less free carbon. As an example, the boron carbide product made by high temperature reaction of boron oxide and carbon, in which the oxide is melted or volatilized usually contains a large amount of free carbon in the form of laminated flakes of graphite which are distributed throughout the mass of the product. The graphite laminations break up the continuity of the material to such an extent that it is of little use as an abrasive, cutting tool, or refractory, even though in its pure state it is hard enough to scratch silicon carbide.

It has been found that the application of relatively low external pressures on a mixture of a metal oxide and finely divided carbon during heating enables the metal carbide to form at temperatures as low as 1400°–1600° C., a temperature which is well below the melting or decomposition point of the oxide of most of the metals whose carbides are under consideration here, and well below the decomposition point of all the resulting carbides. This temperature is also well within the temperature range in which containers other than carbon or graphite may be used, and to produce which, cheaper sources of heat than electricity may be employed. The metals whose carbides may be formed by this method are not confined to any one group in the periodic table. Those metal carbides which are of particular value for use as abrasives have a hardness of approximately 9 or higher on Mohs' scale. In general, these hard carbides are also refractory, having melting or decomposition points above 2000° C.

The invention will be more readily understood by reference to the accompanying drawing, in which the figure shows schematically, partially in cross-section, one type of simple apparatus employed in forming the carbides.

A graphite tube 1, containing the charge 3 of metal oxide and finely divided carbon, has plungers 2 of graphite snugly fitting therein. The tube 1, the charge 3, and plungers 2, assembled as shown, are put between relatively movable contact plungers P of a resistance furnace, said plungers being movable together on insulating support S either manually by means such as a screw, or by power means, as through the medium of a hydraulic cylinder and piston. The metal oxide and carbon powder charge, is of stoichiometric proportions except that a deficiency of powdered carbon is provided since the mixture is wet with a small amount of hydrocarbon, which may be in the form of kerosene or other liquid hydrocarbon. The kerosene is added both to drive out the air to reduce the possibility of nitride formation, and to furnish a certain amount of well distributed reactive carbon by its decomposition to react with the metal oxide in the charge 3. The charge mixture 3 may be compressed before being placed in tube 1. This pressure is not critical, but as an example, in order to afford convenience in handling, pressures ranging upwardly from 2000 p. s. i. may be used to form the charge into a pellet. However, this precompression of the mixture 3 may be omitted, all compression of the mixture taking place, in that case, in tube 1 under the action of plungers 2. To insure nonoxidizing conditions within the tube 1, it is surrounded by another larger and longer carbon tube 7, and the space between plungers 2 and tube 7 is filled with fine powdered carbon 6. An opening 5 is provided in tube 7. An optical pyrometer focussed upon the outer wall of tube 1 through opening 5 yields a sufficiently accurate reading of the temperature of charge 3, after the parts have been heated to the reaction temperature. Plungers 2 are advanced to be in firm contact with charge 3 and to compress it if it has not previously been compressed. Current is then flowed through furnace parts P, carbon plungers 2, tube 1, and the compressed powder charge 3. As the temperature of the charge rises, pressure is applied to the charge by moving parts 2 together, and is kept on the charge throughout the heating period. The heating period may be of any convenient length since it has been found that appreciable carbide formation takes place in even as short a time as 15 minutes and in some instances nearly complete conversion is obtained in 20 minutes at 1600° C. The pressure used may be comparatively high but it has been found that good results are obtained between about 500 and 2000 p. s. i. The pressure acts upon an outer surface or surfaces of the charge in an inwardly direction, and may be designated as mechanical pressure. In most cases at 1600° C., 1000 p. s. i. is sufficient to cause rapid carbide formation. The temperature is held below the melting point of the produced carbide and when the heating period is over the converted charge is allowed to cool out of contact with the air. It is then removed from the mold, and the carbide separated from unreacted carbon and metal oxide.

Other apparatus may be employed to carry out the reaction. Any convenient heating means such as an oil fired kiln, wire wound resistance furnace, etc., may be employed to heat the charge to the reaction temperature. The charge, of course, must be kept under the indicated pressure and under non-oxidizing conditions. Any temperature high enough to make the particular reaction proceed, but below the melting point of the carbide produced may be employed. A temperature between 1400–1700° C. is to be preferred however, because of apparatus cost considerations and the fact that carbides formed at lower temperatures are likely to be purer.

Among the carbides which may be made by the method of this invention are those formed by reacting carbon, in the proportions given, with the metal oxides listed in Table A. Substantial amounts of carbide are obtained in these examples by use of pressure of 500 to 1000 p. s. i. at 1600° C. for a period of 20 minutes. As will be observed, this group of carbides are quite hard, all having a hardness on Mohs' scale of 8 or more, but other carbides of lesser hardness can of course be produced by the same method. The examples given are thus illustrative only, the invention being limited only by the scope of the appended claims.

Table A

| Oxide employed | Molecular proportion of oxide to carbon |
| --- | --- |
| 1. Tungsten oxide ($WO_3$) | 1:4 |
| 2. Titanium dioxide ($TiO_2$) (also ran at 2000° C. and 1750° C.) | 1:3 |
| 3. Vanadium oxide ($V_2O_5$) | 1:7 |
| 4. Zirconium dioxide ($ZrO_2$) (also at 1900° C.) | 1:3 |
| 5. Molybdenum trioxide ($MoO_3$) | 2:7 |
| 6. Tantalum oxide ($Ta_2O_5$) | 1:7 |
| 7. Boric oxide ($B_2O_3$) | 2:7 |
| 8. Yttrium oxide ($Y_2O_3$) | 1:7 |
| 9. Cerium dioxide ($CeO_2$) | 1:4 |
| 10. Thorium dioxide ($ThO_2$) | 1:4 |
| 11. Beryllium oxide (BeO) | 2:3 |

The use of pressure applied during heating of the metal oxide-carbon mixtures makes possible the formation of hard carbides at moderate temperatures. In all of the reactions of the mixtures given as examples in Table A, with the exception of those employing $B_2O_3$ and $V_2O_5$, the reaction temperature employed is lower than the melting point of the metal oxide employed. However, $V_2O_5$ upon being heated under non-oxidizing conditions, breaks down to lower oxides, $V_2O_3$, VO and $V_2O$, none of which melts or decomposes at the temperature of 1600° C. In all cases except $B_2O_3$, therefore, the formation of the carbide must take place by diffusion in the solid state. This is borne out by the character of the products obtained from such reactions, these products being loose and powdery, and not fused. The solid diffusion is greatly accelerated, or made possible only by maintaining the mixture under pressure during heating. The pressure brings about and maintains a very intimate contact of the carbon with the metal oxide and thus promotes the formation of carbide crystals. At the same time, the facts that the reaction temperature is low, and that the oxide, in general, is not molten, make possible the use of less refractory containers for the reaction mixture than graphite or carbon.

Furthermore, in all cases, including that in which boron carbide is formed, the carbide produced melts at a temperature much above the reaction temperature employed. Thus the carbide is never molten, but is formed as a solid phase by the above-mentioned diffusion between the oxide and the carbon. Such solid metal carbide will absorb free carbon much less readily than would a molten metal carbide. By reason of such fact, it is possible, to produce hard metal carbides of greater purity than those heretofore made by first obtaining the molten carbide and then solidifying the melt.

When the metal carbide resulting from the process of the present invention is to be used as an abrasive, it may be subjected to treatment which will convert it into granules of the proper size. The process set out below, for doing this, is merely given as one example of the various ways in which this result may be achieved.

The metal carbide is mixed with a temporary binder, such as 1 oz. of gum tragacanth in 1 pint of water, the binder being used in the amount of ½%, by weight of the carbide. It is obvious that any temporary binder which will not contaminate the product and will be driven off upon being heated may be used. The mixture is pressed into pellets or slugs under high pressure, on the order of 100,000 p. s. i. or upwards, and is then sintered by being placed on a boat or support of graphite, zirconium oxide, or other very refractory material, which is charged into a carbon tube furnace traversed by dry hydrogen. Such furnace operates at a high temperature, on the order of 2000° C. or above, the temperature employed depending on the sintering temperature of the particular carbide employed. After the pellets are heated for a sufficient length of time to sinter them and thereby to form each one into a rigid bonded structure, they are pushed from the furnace into a cooling tube, in communication with the furnace tube, and likewise traversed by a stream of dry hydrogen. After cooling, the resulting sintered pellets are crushed to form particles of abrasive grit size, which can then be used in the making of abrasive wheels, stones, or other abrasive articles.

Having thus fully described our invention, we claim:

1. The process of making hard metal carbides which includes the steps of intimately mixing the powdered oxide of a metal whose carbide is hard and refractory and finely divided carbon in approximately stoichiometric proportions, wetting the mixture uniformly with a relatively small amount of a hydrocarbon, heating the mixture at a temperature between 1400° C. and 1600° C. and below the melting point of the resulting metal carbide, and under a mechanical pressure of from about 500 to 2000 p. s. i. for a period of less than one-half hour, whereby a substantial part of the mixture reacts to form the metal carbide in loose, powdery form.

2. The process of making abrasive particles of hard metal carbide which includes the steps of intimately mixing the powdered oxide of a metal whose carbide is hard and finely divided carbon in approximatey stoichiometric proportions, wetting the mixture uniformly with a relatively small amount of a hydrocarbon, heating the mixture at a temperature between 1400° C. and 1600° C. and below the melting point of the resulting metal carbide, and under a mechanical pressure of from about 500 to 2000 p. s. i. for a period of less than one-half hour, whereby a substantial part of the mixture reacts to form the metal carbide in loose, powdery form, separating the carbide from any unreacted mixture, mixing the carbide with a temporary binder, compressing the mixture to form a pellet, sintering the pellet to form a rigid bonded structure, and crushing the sintered pellet to form metal carbide particles of abrasive size.

RAYMOND C. BENNER.
WILLIAM G. SOLEY.